Jan. 31, 1967  HSUE C. TSIEN  3,301,775
OXYGEN DIFFUSION ANALYZER
Filed July 14, 1964  2 Sheets-Sheet 1

HSUE C. TSIEN  INVENTOR
BY George M. Gould
PATENT ATTORNEY

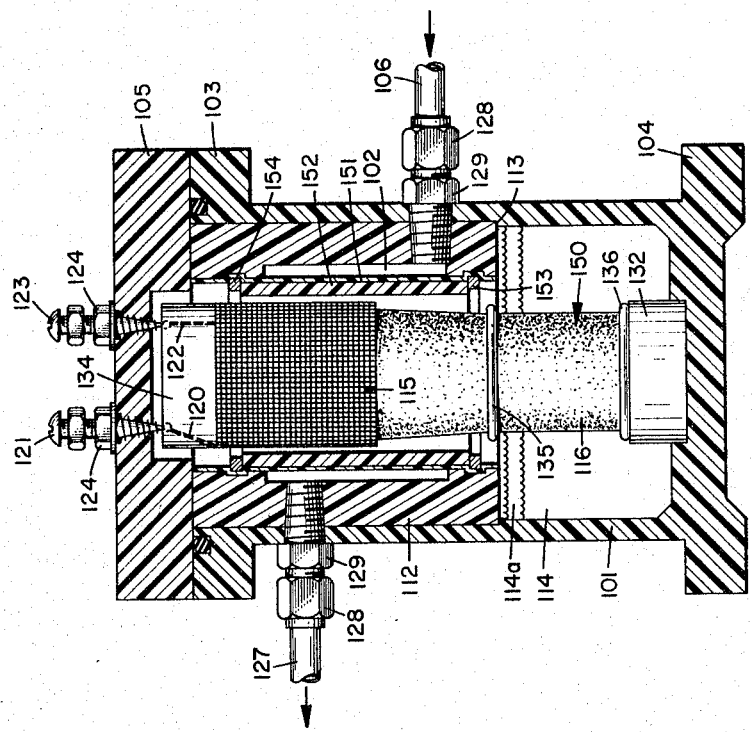
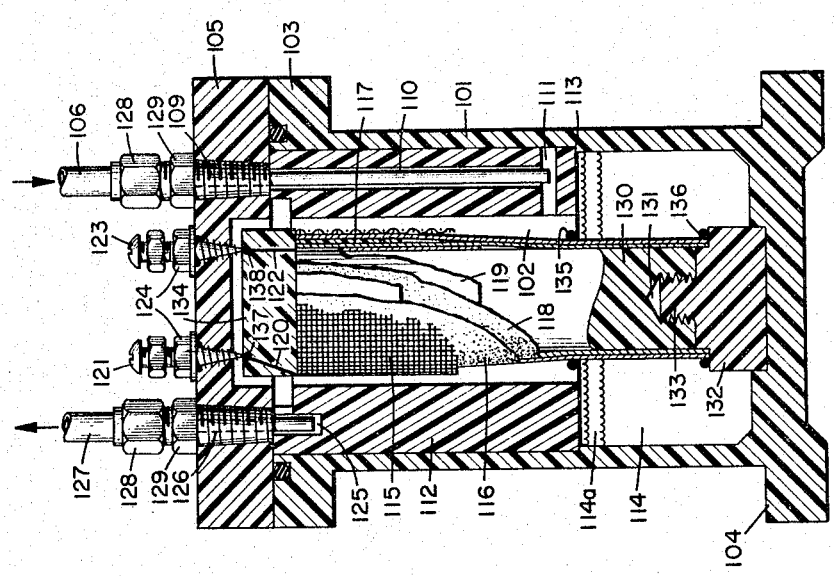

United States Patent Office 3,301,775
Patented Jan. 31, 1967

3,301,775
OXYGEN DIFFUSION ANALYZER
Hsue C. Tsien, Livingston, N.J., assignor to Esso Research and Engineering Company, a corporation of Delaware
Filed July 14, 1964, Ser. No. 382,549
8 Claims. (Cl. 204—195)

This invention relates to an improved apparatus and methods of use thereof to effect the rapid determination of the quantity of a specific gas present in a fluid sample stream, said determination being unaffected by the presence of other gases. In particular, this invention involves a diffusion controlled galvanic cell suitable for the determination of oxygen concentrations and sample streams, said cell showing unexpectedly superior response time due to the inclusion therein of an acetic acid electrolyte having a hydrocarbon oil layer such as a petroleum distillate mineral oil thereon. The addition of an acetic acid electrolyte with a hydrocarbon oil layer thereon yields the further benefit of allowing the cell to be utilized for the direct determination of oxygen where the gas sample stream contains substantial amounts of carbon dioxide. Furthermore, it is additionally contemplated to utilize the apparatus and method of the present invention to test for oxygen in liquid as well as gas streams. Additionally, the apparatus of the present invention may be adapted to test for the presence of carbon dioxide in sample streams.

Recently, there has been a great deal of interest in the analytical art for a method which would yield a quick and accurate determination of oxygen concentration in gas streams. A number of patents have issued, teaching the use of both polarographic or galvanic methods. Of the former, U.S. Patents 2,898,282 and 2,913,386 are of interest for showing the electrolytic reaction of oxygen at fixed, impressed potential levels. The second approach has been based on the interaction of oxygen with a cathodic electrode in a galvanic cell and measurement of the resulting current. Examples of this method include U.S. Patents 2,805,191 (trace amounts of $O_2$), 2,943,028 (trace amounts of $O_2$), and 3,028,317 (up to 21% $O_2$ by use of a moving electrolyte film). Additionally, the system described in U.S. Patent 2,805,191 has been somewhat improved by Baker et al. as described in "Industrial and Engineering Chemistry," vol. 51, No. 6, June 1959, pp. 727–730.

A highly improved apparatus and method for the determination of oxygen in gas streams is disclosed in a copending and coassigned application Serial No. 307,229, filed September 6, 1963, inventors Hsue C. Tsien and Hugh H. Horowitz. The invention disclosed therein concerns the use of the principle of the galvanic cell comprising two electrodes coupled by an electrolyte to determine oxygen concentrations in sample streams. In this application the gas sample stream is introduced in such a manner so as to cause it to flow over the outermost electrode which functions as a cathode. Oxygen contained in the gas stream reacts at the cathode to form hydroxide ion and a small amount of hydroperoxyl as shown by the following equations:

$$O_2 + 2H_2O + 4e \rightarrow 4OH^{\ominus}$$

$$O_2 + H_2O + 2e \rightarrow OH^{\ominus} + O_2H^{\ominus}$$

Similarly, at the anode a corresponding series of half cell reactions take place. In the following equations, M represents the metal utilized as the anode and $n$ is its valence:

$$M + nOH^{\ominus} \longrightarrow M(OH)_n + ne$$

$$\tfrac{4}{n}M + OH^{\ominus} + O_2H^{\ominus} + H_2O \longrightarrow \tfrac{4}{n}M(OH)_n + 2e$$

In the absence of oxygen in the gas stream, no reaction will occur in this cell, the cathode being selected from a metal not being reactable with the electrolyte at any time and the anode being reactable with the electrolyte only when oxygen is being reduced at the cathode.

The current produced by the cell is a direct function of the oxygen concentration in the gas sample stream contacting the cathode. This current is led through an external circuit connecting the electrodes and is measured. By calibrating the system against gas streams having known concentrations of oxygen, the current amplitude will yield a direct representation of the oxygen concentration contained in the sample.

The basic galvanic cell described above was improved in Serial Number 307,229 by the introduction of a diffusion barrier which covered a part of the area between the cathode and anode. The height of this barrier was selected so as to maintain maximum responsiveness in the cell at a lower over-all activity level. For example, the height of the barrier varied from 1/10 to 9/10 the height of the cathode, preferably 4/10 to 6/10. This, of course, reduces the output of the cell but it does not have the same effect as simply reducing the electrode areas. Reducing the electrode areas reduces the currents proportionally but does not change the current density or the flat slope of the output-oxygen concentration curve. Adding the diffusion barrier reduces the cell current, but increases the slope significantly, rendering the curve sufficiently linear that measurements can be made up to 100% oxygen concentration. Furthermore, the reduced currents yield a reduced anode current density which prolongs the life of the cell.

It is believed that the output of the cell is reduced by the fact that the pathway for the migration of ions through the electrolyte is lengthened by the obstructing barrier. However, due to the excellent conductivity of the electrolyte solution and the low current densities involved, the voltage drop due to resistance is not excessive, and areas on the anode and cathode on both sides of the diffusion barrier are still electrochemically active. However, the diffusion of oxygen through the electrolyte to the surface of the anode is drastically reduced due to the lengthened electrolyte pathway, the low solubility of oxygen and the small concentration gradient causing its diffusion. Thus, the chemical reaction of oxygen at the anode is no longer limiting the output of the cell and the output is again sensitive to the oxygen partial pressure at the cathode.

It has further been found in Serial Number 307,229 that introduction of the diffusion barrier between the cathode and anode eliminates the substantial temperature dependence previously found in galvanic cells of this type. Again the suggested mechanism may explain this result. The side reaction of oxygen at the anode may be purely a chemical reaction of 10 kcal./mole or more activation energy. To the extent that it occurs therefore it increases the temperature sensitivity of the cell. The main oxygen electrochemical reaction at the cathode is primarily diffusion controlled, its rate depending on the solubility and diffusion constant of oxygen. Raising the temperature increases the diffusion constant but reduces the solubility of oxygen, thereby giving very little temperature sensitivity. The diffusion barrier, by accentuating the main reaction in relation to the side reaction, therefore decreases the temperature sensitivity of the cell.

The electrolyte utilized in the diffusion controlled oxygen analyzer of Serial Number 307,229 was KOH. The use of KOH resulted in serious problems when the sample gas stream contained large concentrations of $CO_2$ or other acid gases such as hydrogen sulfide, acetylene, hydrogen, cyanide, sulfur dioxide, nitrogen dioxide and the like. These acid gases will, of course, react with the KOH electrolyte and will, when present in concentrations greater than about 1%, result in serious perturbations of the system.

It has now been found that sample gas streams containing relatively large concentrations of acid gases such as $CO_2$ can be effectively sampled for the quantitative amount of oxygen they contain by directly utilizing a galvanic cell employing acetic acid as the electrolyte. Acetic acid is present in the cell as a 5 to 30% solution, preferably a 10 to 15% solution. The electrochemical reactions arising from the use of acetic acid are postulated as follows:

$$CH_3COOH \rightarrow H^+ + CH_3COO^-$$

At cathode (silver)

$$O_2 + 4H^+ + 4e \rightarrow 2H_2O$$

At anode (e.g. Pb) metal (M) with valence $n$.

$$n(CH_3COO)^- + M \rightarrow M(CH_3COO)_n + ne$$

It has further been found that superior results are obtained by the addition of a layer of a petroleum distillate mineral oil to the top of the acetic acid electrolyte level. This layer of mineral oil substantially reduces the evaporation of the acetic acid thus preventing any changes in the response of the cell due to changes in the concentration of the electrolyte during the course of the analysis. Unexpectedly, the addition of the mineral oil layer to the top of the acetic acid electrolyte results in a much faster time of response in the cell to changes in the oxygen content of the gas sample stream. The sensitivity of this cell to oxygen is also slightly enhanced but to a much lesser extent than the change in the time of response.

The superior response time is not believed to be a result of a physical interaction of the mineral oil layer. The filter paper which is used to wet the electrodes is preferentially wetted by acetic acid and therefore the capillary action of the paper would not be affected by the addition of the mineral oil layer. Rather, it is believed that a catalytic action is introduced by the addition of the mineral oil so that in effect, the oxygen and hydrogen ions can react faster than if no oil were added. The types of mineral oil that have been found to exhibit this effect include white oil, transformer oil and hydraulic oil. It is contemplated that petroleum distillate mineral oils generally will exhibit this phenomenon and that therefore this list should not be taken as restrictive in any way as to limits of the present invention.

The prescrubber previously found necessary with an oxygen diffusion analyzer employing KOH at the electrolyte becomes an optional feature when acetic acid is the electrolyte. This prescrubber utilizing acetic acid would be used mainly to remove gross impurities from the fluid sample stream, such as grease, dirt, or other similar materials. It would also be possible to eliminate the prescrubber entirely and utilize a filter for this purpose.

On the other hand, if the sample gas stream contains substantial amounts of gasic impurities, such as ammonia or substituted amines, it would be desirable to utilize a prescrubber so that the basic components of the gas sample stream would not react with the electrolyte in the analyzing cell. In a specific embodiment, the acetic acid prescrubber would contain a solution containing 5 to 30% acetic acid, preferably 10 to 15%.

Due to the high order of volatility of the acetic acid solution in the analyzer cell, the level of the acetic acid is subject to extreme changes during the course of a gas analysis as the acetic acid is picked up by the sample gas stream and carried out. While the mineral oil layer will help to prevent evaporation of the acetic acid, the entrainment of acetic acid by the gas stream cannot be avoided. In order to maintain the acetic acid level at a relatively fixed value, it is desired that makeup acetic acid be supplied to the analyzer cell by means of a reservoir and a flow tank system. Additionally, the flow tank itself can be provided with a sample gas inlet which is bled from the main sample gas line. By introducing the sample gas into the flow tank containing the makeup acetic acid, it is possible to prevent sudden surges or depressions in the acetic acid level in the analyzer due to extreme changes in the sample gas pressure since the pressure on the makeup acetic acid will thus be maintained at about the same pressure found in the analyzer itself.

The analyzer can be modified so as to receive a liquid instead of a gaseous sample stream in its annular test-cell. This can be accomplished by using a thin, porous plastic membrane about the electrode area which permits dissolved oxygen to diffuse out of the liquid sample. Thus, sample liquids such as liquid hydrocarbons, e.g. gasoline, kerosene, benzene, etc.; or aqueous samples such as sea water, fruit juice, etc., can be tested directly for their oxygen content. It should be understood that in such an embodiment employing a liquid sample stream, the sample stream is maintained in a segregated fashion from the electrolyte pool. This can be accomplished by using an impermeable plastic layer between the electrolyte pool and the sample liquid cavity. The oxygen contained in the sample liquid diffuses through the selective plastic membrane which allows only gas to pass through but prevents liquids from so passing. The diffused oxygen then contacts the galvanic electrode assembly in the normal manner and measurements are made as previously indicated. Furthermore, if scrubbing were desired, suitable modifications would have to be made in the prescrubber to adapt it to scrub liquids. Such modifications are known in the art and as such do not play a part in the present inventive concept.

The present invention will be made more clearly evident by reference to the accompanying figures:

FIGURE 2 is a cross-sectional view taken through the central vertical plane of the galvanic cell section of the oxygen analyzer adapted for a gaseous sample stream;

FIGURE 3 is a cross-sectional view taken through the central vertical plane of the galvanic cell section of the oxygen analyzer adapted for liquid sample streams.

Figure 1:
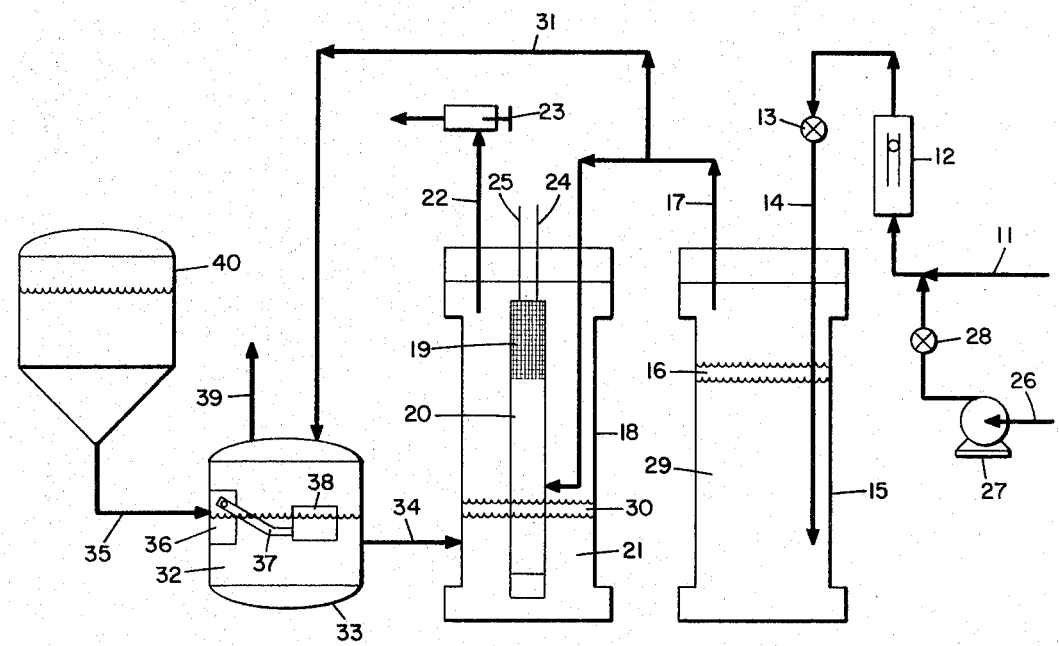
FIGURE 1 is a flow diagram of the oxygen analyzer system.

Turning now to FIGURE 1, the sample fluid stream to be analyzed enters by means of inlet line 11. The rate of flow of the sample stream may be controlled by means of flow meter 12 and valve 13 although the system is relatively insensitive to changes in flow rates in the range of about 0.5 to 1.5 c.f.h. Since most sample stream feed rates will be within this range and since the system will still be rather insensitive to changes in feed rate outside of this range, the presence of flow meter 12 and valve 13 is helpful but by no means necessary to the successful functioning of the oxygen analyzer system. The sample stream then passes into prescrubber chamber 15 by way of line 14. Prescrubber chamber 15 contains a dilute solution of the electrolyte utilized in the galvanic cell section.

In a preferred embodiment of the present invention, the prescrubber solution comprises a major quantity of a 10 to 15% acetic acid solution covered by a relatively thin layer of mineral oil 16. The prescrubber is used to saturate the sample stream with a electrolyte and thus reduces evaporation loss of the electrolyte in the galvanic cell section. Maintenance of a uniform electrolyte level is important in the galvanic cell since substantial changes in this level will affect the reproducibility of the cell's output. Additionally, the prescrubber serves to maintain the electrolyte concentration fairly constant in the galvanic cell section. However, the inclusion of a prescrubber is not necessary to the functioning of the apparatus since other means can be employed to maintain the electrolyte level and concentration fairly constant. Furthermore, a filter can be utilized in the line to prevent passage of contaminating materials into the galvanic cell section.

Scrubbed gas containing some entrained electrolyte and moisture leaves prescrubber 15 by means of line 17. This gas is then carried to the galvanic cell section 18. The gas is allowed to pass onto cathode electrode 19, which is wrapped around core element 20 so as to cover a portion of core element 20's total area. In a preferred embodiment, the gas stream flowed at a direction perpendicular to the vertical axis of the core element when it contacted cathode 19. This can be accomplished by suitable modifications in the construction of the gas stream inlet into cell 18 which will be explained in greater detail later in this paper. Use of this perpendicular flow technique allows the gas stream to enter cell 18 at the electrode level directly and eliminates the necessity of bubbling the gas stream into the electrolyte pool 21 which would be undesirable for efficient operation of the electrolytic cell.

Core element 20 also contains an anodic electrode element which is located closer to the central core than cathode electrode 19. The two electrodes are seperated by one or more layers of absorbent material which descends into electrolyte pool 21 and is wetted uniformly and selectively by the electrolyte due to capillary action. The wetted absorbent serves as an electrical path between the cathode and the anode due to the diffusion of the electrolyte through it. A layer of mineral oil 30 is situated on the electrolyte pool 21. It has been found that the mineral oil does not affect the wetting of the absorbent.

The electrical circuit is completed by means of leads 24 and 25 connecting the cathode and the anode, respectively, to the external measuring circuit. The construction of the core element and the electrode elements contained therein will be described in greater detail later. The sample stream, after contacting core element 20 and its superimposed cathode electrode element 19, passes out of the cell by means of line 22 where it is led to the exhaust. This line may be controlled by the use of a valve 23, e.g. a needle valve, so as to prevent the introduction of air or other sources of oxygen-containing gas during the period when the cell is in an off condition.

When it is necessary to calibrate the system against gas streams containing known oxygen concentrations (e.g., air having a known oxygen content of about 21% or purified oxygen having an oxygen content of 99.9%), the calibrating gas may be introduced through line 26. A pump 27 may be provided to ensure sufficient pressure to allow the calibrating gas to pass through the system. Calibration gas flow rate may be controlled by use of valve 28, which additionally serves to close off the system from line 26 when calibration is no longer needed.

The electrolyte pool 21 is maintained at a selected desirable level by means of a continuous electrolyte supply from reservoir 40. Flow from reservoir 40 via conduit 35 is controlled by means of flow tank 33. An electrolyte pool 32 is maintained within flow tank 33 at about the same level as the electrolyte pool 21. When the electrolyte level in pool 21 is reduced by means of loss through entrainment, additional electrolyte flows into pool 21 from pool 32 by means of conduit 34. This readjusting flow causes float 38 to drop relative to conduit 35. This dropping motion is transmitted by means of arm 37 to valve means 36 and allows additional electrolyte to flow from reservoir 40 until the desired level of the electrolyte pool 21 has been attained.

In order to avoid sudden fluctuations in the electrolyte level, flow tank 33 is exposed to the sample stream by means of line 31. In the embodiment depicted in FIGURE 1, the bleed off of the sample stream has taken place at line 17. It is evident, of course, that such bleed off could occur anywhere before this point. However, it is desirable to utilize the sample stream which has been prescrubbed to remove gross contaminants. The sample stream leaves flow tank 33 by means of exhaust line 39.

The embodiment depicted in FIGURE 1 was utilized in a series of tests to determine the effect on response of the cell due to the addition of a layer of "inert" oil to the electrolyte. The electrical output of the cell was measured and recorded every 5 seconds and plotted for up ($N_2 \rightarrow 3\%$ $O_2 + 15\%$ $CO_2$ balance $N_2$) and down (reverse of previous process) square wave impulse stepped input. The summary of results follows:

TABLE I.—IMPROVEMENT IN RESPONSE TIME TO GET 63.2% FULL SCALE READING

| 6 c.c. of oil | Up[1] | Down[1] |
| --- | --- | --- |
| Transformer Oil | −18.5% (8.0 sec.→9.5 sec.). | 13.8% (14.5 to 12.5 sec.). |
| Hydraulic Oil | 4% (7.5→7.2 sec.). | 6% (10.2→10.0 sec.). |
| White Oil (in sensor only). | 8.5% (8.4→7.5 sec). | 14.4% (17.2→14.7 sec.). |
| White Oil in sensor+White Oil (1 layer 10 c.c.) in scrubber. | 9% (8.5 sec.→7.75 sec.). | 15.7% (14.6→12.3 sec.). |

[1] These times are compared to response time of a cell containing 12% acetic acid alone as electrolyte.

An oxygen analyzing cell containing 24% KOH working under similar conditions (i.e. up from $N_2$ to 3% $O_2$ (full scale) balance $N_2$ and down in reverse direction) would give an up response time of approximately 15 seconds and down response time of 30 seconds.

Turning now to FIGURE 2, a cross-sectional view through the central vertical plane of a galvanic cell section adapted for a gaseous sample stream is shown in some detail. The cell section is constructed of a material resistant to attack by acetic acid. Preferably, the cell is made of acrylic (Lucite) which is inert to acetic acid and additionally is transparent, thereby allowing direct examination of the cell during operation. Acrylic may also be utilized in the construction of the prescrubber described previously.

The galvanic cell section consists of an annular vessel 101 cast from acrylic having a central cavity section 102. The wall of vessel 101 is formed so as to have a greater cross-sectional thickness at its upper 103 and lower 104 vertical extremities than through the central portions of the wall. The thickened upper portion 103 serves as a support for cell cover 105 which may be secured to vessel 101 by the use of any suitable fastening means, e.g., bolt, screws, clamps, etc. It is preferred that stainless steel screws be used, thus allowing quick and easy detachment of the cover whenever it is necessary to service the interior chamber. The thickened lower portion 104 may be suitably formed so as to perform the functions of a base support for the cell structure.

In the operation of the cell, the prescrubbed gas sample stream enters by means of inlet tube 106 which is connected to prescrubber chamber 15 by means of line 17 as described in FIGURE 1. Inlet tube 106 extends all the way down to the center of cross-drilled passage 111 by means of passage 109 bored to cover 105 and passage 110 bored to acrylic jacket 112. This jacket is supported in cavity 102 by means of indentation 113 in the inner side of the central portion of vessel 101.

In the embodiment depicted, inlet 106 is secured to cover 105 by means of threaded and tapered lock fittings 128 and 129. As stated previously, inlet 106 communicates directly with passage 111, which has one end sealed off into a dead end so the gas will only flow into cavity 102. The flow modulated gas stream enters cavity 102 at a point above the level of electrolyte pool 114. The electrolyte pool 114 is characterized by having a mineral oil layer 114a on its surface. The height of this mineral oil layer is not critical but preferably is within the range of 1/32 to 3/32 inch. However, the level of the mineral oil will also be below the entrance point of the sample gas stream so as not to have any physical interaction with said gas stream, thereby causing variations in electrolyte level.

The gas stream then contacts the electrode assembly of the galvanic cell. This assembly is depicted in FIGURE 2 in a cross-sectional view through its various concentric layers in a preferred embodiment. The outermost portion of this assembly consists of the cathode electrode 115. This cathode is in the form of a screen electrode and is resistance-welded or lock seamed to form a complete cylinder. When the sample gas stream contains low concentrations of oxygen, e.g. <21%, it is preferred that cathode 115 be prepared from a silver screen having a mesh in the range of about 60 to 120. On the other hand, when high concentrations of oxygen are to be measured, e.g. >21%, it is desirable to use a Monel screen having a mesh in the range of about 60 to 120. Other materials which may be used as a cathode for oxygen analysis include nickel and stainless steel. However, such cathodes are not as sensitive as the desired forms and, further, may introduce noise into the circuit which seriously affects the reproducibility of results.

Cathode electrode 115 is maintained in contact with electrolyte pool 114, e.g., 10 to 15% acetic acid solution, by means of an adsorbent layer 116 which is formed as a concentric cylinder with a slightly smaller diameter than cathode electrode 115. The adsorbent layer is of a length sufficient to contact electrolyte pool 114 and will drop in amount of electrolyte by capillary action which will uniformly wet its surface. It has been found that a layer of laboratory filter paper, e.g., Whatman No. 50 hardened filter paper, is eminently suited for this purpose and will stand up to saturation with acetic acid for extended periods of time.

Beneath the adsorbent layer 116, a diffusion barrier layer 117 is introduced. In a preferred embodiment, this layer consists of a film of a nonporous, inert plastic such as polyethylene, polypropylene, nylon, Mylar, Teflon, etc., having a thickness within the range 0.0001 inch to 0.0300 inch, preferably 0.0005 inch to 0.001 inch. The diffusion barrier layer is also formed into a concentric cylinder having a diameter slightly less than that of the absorbent layer. This barrier acts as a partial shield between the cathode and anode. The activity of the cell can be changed by changing the height of the diffusion barrier and this should be done proportionately to the oxygen concentration in the sample gas stream, e.g., a high oxygen concentration should be measured with a cell employing a diffusion barrier of greater height than when a low oxygen level is being measured.

For example, the diffusion barrier height may be from 1/10 to 9/10 the height of the cathode. When relatively high oxygen levels are being measured, it is preferred that the diffusion barrier height be between 4/10 and 9/10 the height of the cathode. A reduction in the cell's activity results in the continuation of the linearity of the function describing the relationship between the oxygen concentration and the current output of the cell to oxygen levels up to 100%. Without the employment of the diffusion barrier, this function has a slope approaching 0 at oxygen concentrations above about 6.0%. Above this point, great changes in oxygen concentration produced very little change in the current output of the cell. See Baker et al., supra at p. 729.

A second absorbent layer 118 is located below the diffusion barrier layer 117 and is similar to the first absorbent layer in all respects except that it is formed into a concentric cylinder of lesser diameter. Due to the thinness of the diffusion barrier, the first and second absorbent layers will be in effective contact with each other at those portions of their length which are greater than the length of the diffusion barrier. This insures that an electrically conductive path between the cathode and anode will be obtained.

Anode 119 is formed into a concentric cylinder preferably from a single metal sheet. For the purposes of oxygen analysis, the use of a lead anode is most desirable. The anode is contacted by the second absorbent layer 118 and therefore will be surface wetted with electrolyte. Diffusion thus will be freely possible from the surface of cathode 115 to anode 119 except in that region where diffusion barrier 117 is interposed.

Current generated by the galvanic cell when oxygen is present in the gas stream is passed through an external circuit for measurement. Cathode 115 has a finger-like protruding element 120 which serves to for man electrical junction with terminal screw 121. Similarly, anode 119 is also equipped with a protruding element 122 which allows electrical contact to be made with terminal screw 123. Excess cathode and anode materials are contained in the countersunk recesses 137 and 128 so that good contacts can be made by tightly screwing down screws 121 and 123. Wires from the external circuit are placed about each terminal screw and are secured against terminal 124 for the cathode and anode leads, respectively, by rotation of the terminal screws.

Exhaust gas passes out through outlet tube 127 which extends down through drilled passages 125 and 126. Outlet tube 127 is held in fixed relationship to channel 126 by means of threaded and taper lock tube fittings 128 and 129 in the same manner as previously described for inlet tube 106.

For purposes of convenience, the concentric layers of the electrode assembly are best constructed about a central annular spindle 130 cast from acrylic. This spindle has a circular, threaded cavity 131 extending a short distance into the center of one of its ends. A plug element 132 has a threaded protrusion 133 which is threadably attachable to spindle 130 by means of cavity 131. This plug 132 helps to locate the spindle in a central position in vessel 101. Additionally, spindle 130 has a cap section 134 located at the end opposite cavity 131. This cap section contains two bore holes and countersunk cavities 137 and 138 through its vertical axis which bore holes are adapted to provide a passageway for electrode protrusions 120 and 122.

Replacement of the entire electrode assembly is thereby made extremely simple. Cover 105 is disengaged by removing the holding means utilized to secure it to wall section 103. The spindle assembly can then be lifted out directly. In order to maintain the various layers securely in place, it is desirable to place two "O" rings around the entire assembly at 135 and 136 (shown in the drawing in cross section). Since these "O" rings are in constant contact with the electrolyte, it is preferred that these "O" rings be made of materials which are relatively inert such as Viton rubber or Teflon.

FIGURE 3 represents a cross-sectional view taken through the central vertical plane of the galvanic cell section of the oxygen analyzer adapted to test sample liquid streams. The structural elements which are equivalent to those depicted in FIGURE 2 have been given the same numbers as in FIGURE 3 and further comment thereon will not be necessary.

In this embodiment, sample liquid inlet 106 is in a perpendicular relation to the galvanic cell electrode assembly 150. The sample liquid entering central cavity 102 contacts initially a selectively porous plastic film 151 which is concentrically wrapped about the central electrode assembly 150. The thin plastic film, e.g. a Teflon film having a thickness of about 0.0005 inch, is impenetrable to liquids but has sufficient porosity to allow gas such as oxygen to diffuse through. Since the thickness of the film is so slight, it does not have sufficient structural strength to hold a proper shape and therefore a porous Teflon support member 152 is placed between the electrode assembly 150 and the Teflon film 151. The porous Teflon freely allows the diffusing gas to pass through.

The bottom of the Teflon film 151 is wrapped about stainless steel retaining rings 153 and 154 in such manner that the covered retaining rings form a base for cavity 102 which base prevents the interflow of liquid sample from 102 to the electrolyte pool 114. The film covered retaining rings fit snugly against indentations in this side of acrylic jacket 112 and also are in close concentric contact with the electrode assembly 150.

The sample liquid after filling up cavity 102 to the level of the sample liquid outlet conduit 127, passes out from the analytical section to the exhaust. Since the amount of oxygen contained in a liquid sample will generally be of a lower order of concentration than that of a gas sample, the amount of oxygen diffusing into the electrode section will be relatively small. Therefore, the diffusion barrier Teflon film contained between the anode and cathode can be maintained at a relatively small portion of the area between the said electrodes.

Figure 4:
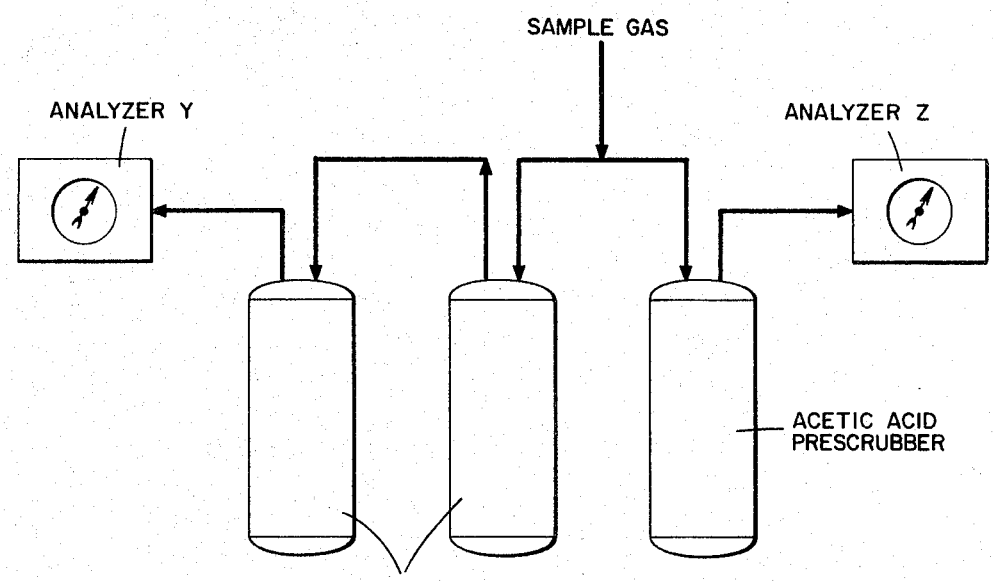
FIGURE 4 is a flow diagram of a double analyzer system utilized in the determination of carbon dioxide concentrations in sample streams.

Reference is now made to FIGURE 4 wherein an embodiment of the present invention utilizing two analyzers whereby the amount of carbon dioxide in a gas sample stream can be determined. As indicated in the diagram, the sample gas stream is split into two parts. One part is passed through two KOH prescribers where the carbon dioxide in the sample gas stream is removed according to the following equation:

$$KOH + CO_2 \rightarrow KHCO_3$$

The $CO_2$ depleted sample gas stream then is analyzed by analyzer Y which contains a galvanic cell analyzer section such as depicted in FIGURE 2 in association with electronic recorder or meter means so that the current generated by said galvanic cell can be measured. Analyzer Y will read the oxygen concentration as a function of $1/1-X$ wherein X is equal to the carbon dioxide concentration in percent.

The other arm of the sample gas stream passes through an acetic acid prescrubber and then into analyzer Z which contains the same components as analyzer Y. Since the acetic acid prescrubber will not interact with the $CO_2$ contained in the sample gas, the second analyzer will read $O_2$ in true percentage. Therefore, assuming that the first analyzer indicates an oxygen concentration of $y\%$ and the second analyzer indicates an oxygen content of $z\%$, then by suitable algebraic manipulation of the above equations, one obtains the expression:

$$x = 1 - \frac{z}{y}$$

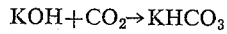

Since $y$ and $z$ are known values, it is possible to solve the single equation for the single unknown and compute $x$.

While the apparatus of the present invention has been disclosed in some detail, it should be noted that the invention is not limited to the particular embodiments described. Extensive changes may be made by one skilled in the electrochemical analysis art without departing from the spirit of this disclosure. Examples of the wide variety of electrode materials, electrolytes, and absorbents usable in galvanic systems are described in the patents and reference article cited previously in this paper. The improvement comprising the present invention may be utilized with good effect on these modified systems and these systems as such are incorporated by reference in the present invention. Additionally, the galvanic cell may be utilized for the analysis of other components in gas streams besides oxygen. Such methods are outlined in U.S. Patent 3,028,317 at column 6, lines 46–62, and may properly be considered in conjunction with the disclosures of the present case as useful embodiments of this invention.

Summarily, the main advantages derivable from the use of the diffusion control galvanic cell system employing acetic acid which is covered with a layer of mineral oil of the present invention include:

(1) Greatly enhanced response time to change in oxygen concentration.

(2) Insensitivity of the system to rapid pressure changes in the gas stream.

(3) Automatic make up of any electrolyte loss due to entrainment in the sample stream.

(4) Reduction of the evaporation loss of the acetic acid electrolyte to a minimum.

(5) Easy adaptability of the system for use in the direct determination of carbon dioxide in sample streams.

What is claimed is:

1. In a galvanic cell for analysis of oxygen in a gas mixture stream, said cell comprising in combination: (A) a container having a restraining wall, sample gas stream inlet and outlet means, an electrolyte pool and electrode assembly supporting means; (B) an electrode assembly so arranged and constructed so as to be supported within said container in such manner as to be directly contacted by said sample gas stream from said sample gas stream inlet means, said electrode assembly comprising in combination a series of contiguous, concentric cylindrical elements wherein said elements comprise in respective order from the external surface: (1) a first electrode reactable with oxygen; (2) a first absorbent layer; (3) nonporous, inert and electrically insulating diffusion barrier means; (4) a second absorbent layer, which layer contacts said first absorbent layer for at least a portion of its surface area; (5) a second electrode; (C) an electrolyte pool which pool is in contact with a portion of said first and second absorbent layers so as to cause these layers to be wetted by the electrolyte; (D) current means adapted to receive current generated by said first and second electrodes when oxygen is present in the cell; wherein said first electrode is not reactable with said electrolyte at any time and said second electrode is reactable only when oxygen is present in the cell; the improvement comprising utilizing acetic acid as the electrolyte, said acetic acid electrolyte being covered with a relatively thin layer of a mineral oil wherein the response time of the cell is improved.

2. The galvanic cell of claim 1 wherein gas stream prescrubber means are operationally connected to said sample gas stream inlet means, said prescrubber means containing acetic acid therein.

3. The galvanic cell of claim 2 wherein said acetic acid in said prescrubber means contains a layer of a mineral oil thereon.

4. The galvanic cell of claim 1 wherein said acetic acid electrolyte pool is operatively connected with acetic acid reservoir means wherein the flow of additional acid from said reservoir means is controlled by valve means.

5. The galvanic cell of claim 4 wherein said valve means are operatively connected with said sample gas stream inlet means so that the sample gas pressure in said valve means is equivalent to the sample gas pressure in said galvanic cell whereby sudden changes in said sample gas pressure will not cause substantial variations in the acetic acid electrolyte level.

6. The galvanic cell of claim 1 adapted for use with a liquid sample stream by means of inserting within said container of said galvanic cell a selectively porous plastic film, said film being so arranged and constructed as to form a selective barrier between said sample stream inlet means and said electrode assembly so as to allow oxygen to diffuse into said electrode assembly but prohibit passage of liquid thereto, said selectively porous plastic film being further arranged and constructed so as to prevent the passage of said liquid sample stream into said electrolyte pool, whereby the oxygen content of said sample liquid stream can be determined.

7. In a galvanic cell for the anlysis of oxygen in concentrations ranging from trace amounts to about 100% of a sample fluid stream, said cell comprising in combination: (A) a container having a restraining wall, sample fluid inlet and outlet means, an electrolyte pool, and electrode assembly supporting means; (B) an electrode assembly comprising in combination a series of contiguous, concentric cylindrical elements wherein said elements comprise in respective order from the external surface: (1) a cathodic electrode prepared in the form of a fine mesh screen from a metallic material selected from the group consisting of silver and monel; (2) a first absorbent layer; (3) a nonporous, inert plastic film having a thickness in the range between 0.005 inch to 0.001 inch and a height selectable according to the concentration range of oxygen contained in the sample fluid stream whereby a diffusion barrier is obtained for the area covered by said plastic film; (4) a second absorbent layer, which layer contacts said first absorbent layer for at least a portion of its surface area, wherein a portion of said first and said second absorbent layers contact said electrolyte pool so as to cause these layers to be wetted by the electrolyte; (5) a lead anodic electrode; (C) current measuring means adapted to receive current generated by said cathodic and anodic electrodes when oxygen is present in the cell, whereby said current is measured and the concentration of oxygen determined independent of the sample gas stream flow rate and the ambient temperature; the improvement comprising utilizing acetic acid as said electrolyte, said acetic acid being covered with a thin layer of a mineral oil whereby the response time of said cell is improved.

8. An apparatus for the determination of carbon dioxide in sample streams comprising in combination a bifurcated sample gas inlet means, one arm of said gas inlet means communicating with carbon dioxide scrubbing means whereby carbon dioxide is removed from said sample gas, said carbon dioxide scrubbing means being operatively connected with the oxygen analyzer of claim 1 wherein the oxygen content of the carbon dioxide depleted sample gas stream is determined; the second arm of said bifurcated sample gas inlet means being operatively connected with a second oxygen analyzer of claim 1 whereby the oxygen content of said sample gas stream is determined directly and whereby further the carbon dioxide content of the original gas stream can be determined by comparing the results obtained from said first and second analyzer.

References Cited by the Examiner

UNITED STATES PATENTS 2,898,282  8/1959  Flook et al. _____ 204—195
3,223,598  12/1965  Jacky et al. _____ 204—195

JOHN H. MACK, *Primary Examiner.*

T. TUNG, *Assistant Examiner.*